(No Model.)
2 Sheets—Sheet 1.
T. B. FOGARTY
PROCESS OF AND APPARATUS FOR MANUFACTURING GAS.
No. 254,204. Patented Feb. 28, 1882.
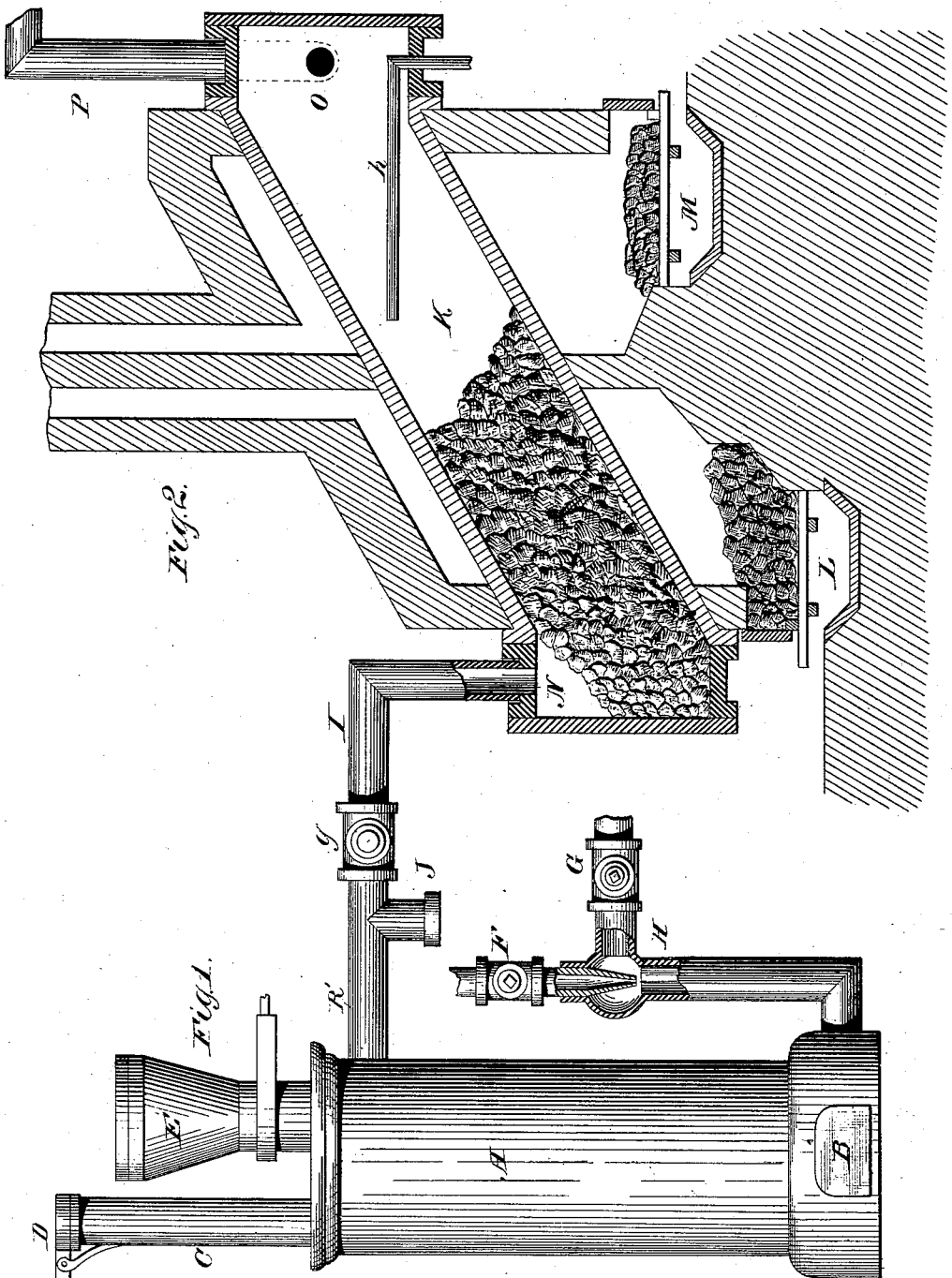

(No Model.) 2 Sheets—Sheet 2.
T. B. FOGARTY.
PROCESS OF AND APPARATUS FOR MANUFACTURING GAS.
No. 254,204. Patented Feb. 28, 1882.
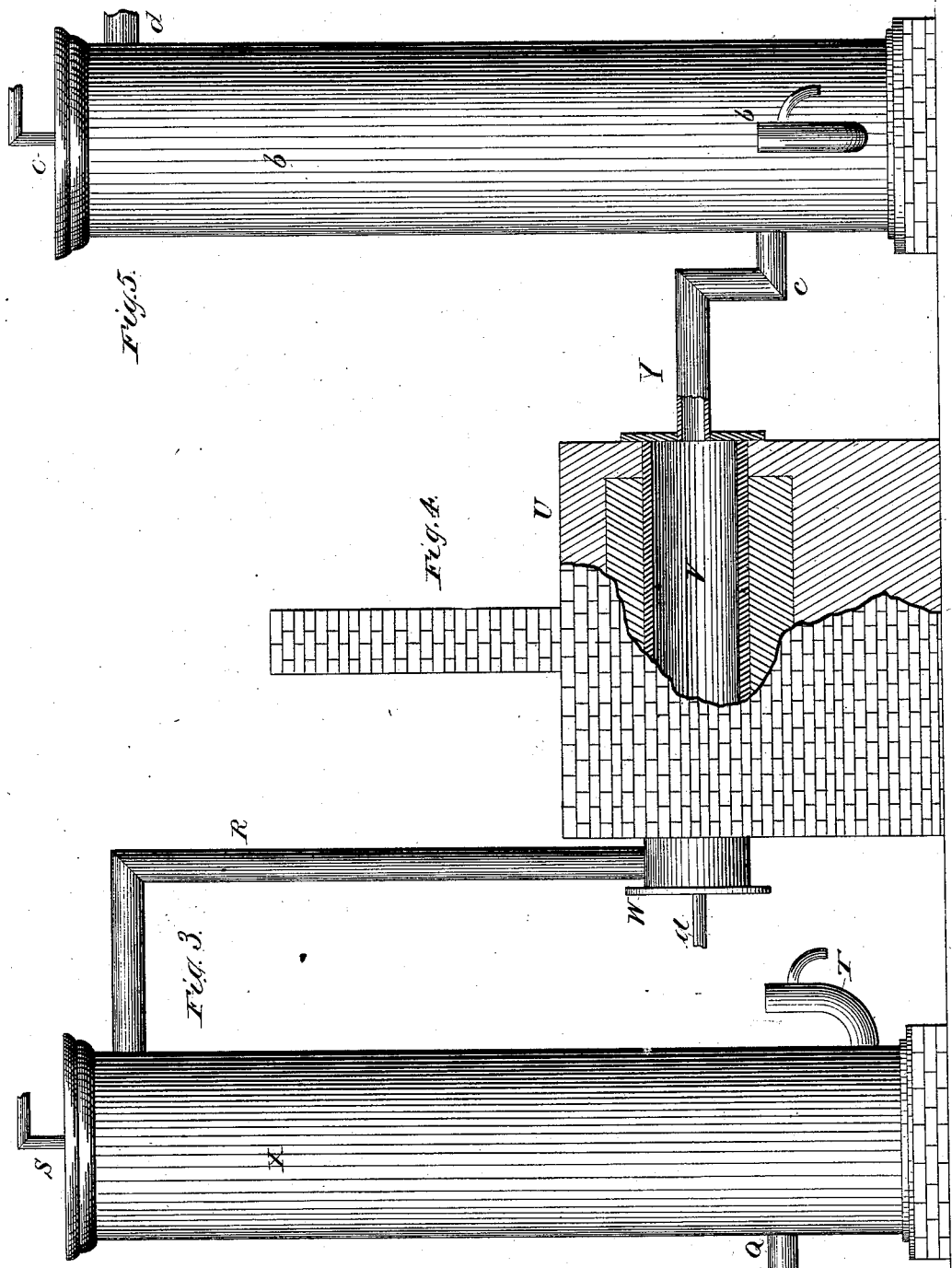

UNITED STATES PATENT OFFICE.

THOMAS B. FOGARTY, OF BROOKLYN, NEW YORK.

PROCESS OF AND APPARATUS FOR MANUFACTURING GAS.

SPECIFICATION forming part of Letters Patent No. 254,204, dated February 28, 1882.

Application filed August 22, 1881. (No model.)

*To all whom it may concern:*

Be it known that I, THOMAS B. FOGARTY, of the city of Brooklyn, county of Kings, and State of New York, have invented a certain new and useful Process of and Apparatus for Manufacturing Gas for Heating and Illuminating Purposes; and I hereby declare the following to be a full, clear, and exact specification of the same, reference being had to the accompanying drawings, forming part of this specification.

My invention relates to the manufacture of heating and illuminating gas through the decomposition of steam by incandescent carbon; and its object is to cheapen the production of such gas and at the same time obtain it practically free from impurities.

It is well known that nearly all of the gas obtained through the decomposition of steam by incandescent carbon, (commonly known as "water-gas," by which name I shall speak of it in this specification,) as heretofore manufactured, is largely contaminated by carbonic oxide—a compound of such a poisonous character that the sale of gas containing it, except within prescribed quantities, is in many places prohibited by State or municipal legislation—while at the same time much of it contains so large a quantity of nitrogen that its value as a heating or illuminating agent is thereby seriously diminished.

The object of my invention is to produce a water-gas which, within desired limits, will be free from the above-mentioned impurities, and at a greatly-reduced cost of manufacture.

I shall now proceed to describe my invention so fully and clearly that any person skilled in the art of making water-gas may be able to understand and practice the same; and for this purpose I shall divide or classify it into and under four different parts or heads, as follows: first, the manufacture of a very cheap but exceedingly impure heating-gas, the chief impurities of which will consist of nitrogen, carbonic oxide, and carbonic acid; second, the partial purification of the gas by the conversion of its nitrogen, either wholly or partly, into ammonia or ammoniacal salts and the separation of these ammoniacal products from the gas; third, the further purification of the gas by the conversion, either wholly or partly, of its carbonic oxide into carbonic acid, with the liberation of a volume of hydrogen equal to that of the carbonic oxide removed; fourth, the complete purification of the gas by the removal of its carbonic acid and sulphureted hydrogen, such purification being chiefly effected by means of the ammonia produced from the nitrogen of the gas itself in the second part of my process.

Be it here understood that when I speak of purification I do not mean that I shall render the gas absolutely free from the impurity to which I may refer, but merely that I shall render it practically and reasonably free from such impurity within desired limits. Be it also understood that when I speak of removing any impurity or other matter from the gas I refer to its removal to a practical and reasonable degree, within reasonable limits.

I shall now proceed to describe in detail the several parts of my invention, their connection with each other and with other parts of my invention not heretofore specified, and the manner of their combination to form a perfect and continuous process.

In carrying out the first part of my invention I admit steam into a close cupola, furnace, or retort of any suitable form or construction, filled, or partly filled, with incandescent carbon—such as coal, coke, charcoal, or peat—and heated by an external fire or by internal combustion, or by a combination of both, and in conjunction with such steam, and by means of any suitable pump, jet, aspirator, or exhauster, I suck or draw or force into and through the said cupola, furnace, or retort a suitable volume of atmospheric air. When the cupola, furnace, or retort is heated externally, either wholly or partly, the volume of air admitted may be regulated according to the percentage of nitrogen which it is desirable that the gas should contain at this time; but when it is heated by internal combustion, as will usually be found the preferable course, the volume of air admitted must bear such a proportion to the volume of steam and the requirements of the combustion taking place within the cupola that the oxygen contained in such air will be capable of supporting the combustion sufficiently to overcome and counteract the cooling effect of the decomposition of the steam, in which case the temperature of the cupola or furnace will be even and uniform, proper provisions of course being made for feeding and cleaning the fire. The steam and air upon one side and the fuel upon the other will now combine with each other to form a highly-combustible gas, which will vary in composition according to the temperature of the furnace or cupola, the relative proportions of the steam and air, and the greater or less thickness of the stratum of incandescent carbon through which it has passed, but under suitable conditions of temperature, &c., having an average composition about as follows: carbonic acid, ten per cent.; carbonic oxide, seventeen per cent.; hydrogen, thirteen per cent.; nitrogen, sixty per cent.

It is evident that by keeping the proportions of air and steam perfectly adjusted to each other the furnace or cupola may be kept at a uniform temperature and the production of gas may be made continuous.

It will be readily seen that the gas produced in this manner is really what is known as a "generator-gas," and while capable of being used to advantage for heating purposes is of little practical use for lighting.

It will also be seen that while part of the gas so produced may be made the basis of an excellent illuminating-gas another portion may be advantageously used as fuel to heat the retorts and other apparatus to be hereinafter described.

I do not claim this process of producing an inflammable gas, broadly, as my invention, for it is old and well known, having been patented in England by Constable, and again by Pollard, in 1845; but I do claim it as a part of my process when used in combination with the other parts thereof and as a part of the said process.

The second part of my invention refers to the removal of the nitrogen, either wholly or partly, from the gas by its conversion, either wholly or partly, into ammonia or some of the salts thereof.

For the purpose of removing the nitrogen, I now cause the gas to pass through a retort or chamber, or series of such, containing coal, coke, charcoal, or any other suitable form of carbon, either solid or gaseous, in a highly incandescent state, and mixed in suitable proportions with an alkali of some sort—such as soda, potash, lime, or barium, or any suitable mixture, compound, or combination of the same; but preferably I use the carbonate of an alkali which parts readily with its acid. Now, under the influence of the intense temperature, the carbon, nitrogen, and alkali will combine to form cyanide and cyanate of the alkali used, and these, being brought into contact with steam at a suitable temperature, are decomposed by it, and give rise to ammonia or ammoniacal compounds formed by the combination of the nitrogen of the cyanides and cyanates with the hydrogen of the steam, the liberated carbon uniting with the oxygen of the steam to form additional volumes of carbonic oxide and carbonic acid, and the alkali returning to its original state, or entering into fresh combinations.

It is well known that ammoniacal gas and many of its compounds are decomposed by a red heat, while other compounds of this gas, notably muriate of ammonia, are merely volatilized at the same temperature, and this circumstance would present an insuperable obstacle to the employment of some alkaline compounds, notably the alkaline carbonates, for the purposes of my invention, were it not that the cyanides and cyanates of the alkalies are decomposed by steam at a temperature much less than that which is required to produce them. From this it follows that in order to prevent the destruction of ammonia or such of its compounds as are decomposed by a red heat it is only necessary to see that, as far as possible, the temperature at which they are formed shall be below a decomposing heat.

As it is evident that ammonia cannot be formed, except in inconsiderable quantities, due to the presence of moisture in the gas, unless steam be admitted to the retort, it is frequently necessary to arrange the retort so as to be heated by a separate fire to each end, or in some other way, so that each end of the retort may be kept at a suitable temperature. The steam being then admitted only to the cooler end of the retort, the resulting ammoniacal products will be in no danger of being destroyed by excessive temperature. For the same reason it is often advisable to effect the decomposition of the cyanogen compounds and the subsequent conversion of their nitrogen into ammonia in a retort or chamber, or series of such, separate from that in which they have been formed, and kept at a lower temperature. It may also be often expedient to effect or cause the formation of the ammoniacal compounds in the same retort or furnace in which the generator-gas is produced, as described in that part of this specification which relates to the first part of my invention. In this case it will be necessary to apply external heat to the generator-furnace, and to lengthen or extend it, or otherwise provide a suitable chamber in which the cyanogen compounds formed within the furnace may be reduced to a temperature suitable for the production and preservation of the ammoniacal products. In this case the alkali may be introduced directly into the generator, which may be done by mixing it with the coal in a mass, or in alternate layers, or by spraying or injecting it, as may be most convenient. When the alkali used is chloride of soda it is not necessary to reduce the temperature of the cyanogen compounds, as the product of their decomposition will in this case be muriate of ammonia, which, instead of being decomposed, is volatilized at elevated temperatures. In any case care must be taken that the cyanogen compounds will be formed at the temperature best suited to their economical production, and that the subsequent ammoniacal products also will be formed at the temperature best adapted to their preservation. The gas, now consisting principally of hydrogen, ammonia in different forms, carbonic oxide, carbonic acid, and such nitrogen as may have escaped decomposition and conversion, is next passed through a suitably-constructed condenser or scrubber, or other cooling apparatus, so as to reduce its temperature sufficiently to admit of the combination of the ammonia and carbonic acid, which always takes place when these gases are brought together at a low temperature. The resulting carbonate of ammonia is very soluble in water, and may be absorbed and separated by it in passing through the scrubber or condenser, or, if desired, in a separate apparatus.

A little reflection will now show why I prefer to use the alkali in the form of a carbonate. By doing so the resulting ammonia will be obtained for the most part in a free or uncombined state, and will consequently be in the best possible form for use as an effective means of removing the enormous quantities of carbonic acid which would otherwise have to be removed by lime—an expensive and laborious operation.

I do not claim broadly as my invention the process of converting nitrogen into ammonia by means of an alkali, for this is old and well known, there being several well-known patented processes for this purpose; but I do claim as new and as my invention the application of any alkali process for the conversion of free nitrogen into ammonia, to the removal, either wholly or partly, of the free nitrogen from a heating or regenerator gas, such as described in that part of this specification relating to the first part of my invention. Nor do I claim broadly as new the process of placing lime or other alkali in a retort with the coal or other carbon during the process of distilling it for the production of gas, for this is old and well known, having been frequently used and patented both in this country and England; but I do claim the combination of an ammonia-producing retort or apparatus with a gas-generator, when used for the purpose of eliminating free nitrogen from the gas, substantially as described.

I do not confine or limit myself to the specific details of my improved process of removing the nitrogen from the gas, for it is very evident that they may be greatly modified.

I shall now proceed to describe in detail the third part of my invention, which relates to the further purification of the gas by the conversion, either wholly or partly, of its carbonic oxide into carbonic acid, with the liberation of a volume of hydrogen equal to that of the carbonic oxide removed.

The gaseous products, being freed from ammonia, and consisting principally of hydrogen, carbonic oxide, carbonic acid, and such nitrogen as may have escaped conversion, are now caused to pass through one or more highly-heated retorts, in which they are brought into intimate contact with steam, when, the entire volume being brought to an intense heat, the steam is decomposed by the carbon of the carbonic oxide, giving rise to a volume of carbonic acid equal to that of the decomposed oxide, and at the same time setting an equal quantity of hydrogen free.

I do not claim this process of removing the carbonic oxide from the gas, broadly, as my invention, for it is old and well known, having been used most successfully for many years at the city of Narbonne, in France; but I do claim it in combination with an ammonia process for removing the nitrogen from the gas, or with any process by which ammonia is artificially and purposely produced as a part of the process of manufacturing a heating or lighting gas through the decomposition of steam by incandescent carbon.

The fourth part of my invention relates to purifying the gas from carbonic acid and sulphureted hydrogen.

In the manufacture of water-gas, as heretofore practiced, it has been found impracticable, with one notable exception, to remove from it the carbonic oxide, which is always generated in large quantities whenever steam is decomposed by incandescent carbon, for the only practical process of removing it was to convert it into carbonic acid, as already described in that part of this specification which relates to the third part of my invention. This process, however, was found to involve too much labor and expense, for it now became necessary to remove the enormous quantity of carbonic acid produced, and the only practical method of doing this was to absorb it by means of hydrate of lime, which was found to be so expensive and laborious that it had to be abandoned, so that the manufacturers of water-gas, finding it much cheaper and handier to do so, have in practice turned their attention to producing as much carbonic oxide as they could and as little carbonic acid as possible, and this notwithstanding the fact that there are several well-known processes for converting the former into the latter gas, the great expense of removing which prevented their use. It will be readily perceived that my practice is the contrary of this, inasmuch as I convert all, or nearly all, my carbonic oxide into carbonic acid, and then remove the latter impurity altogether, for, as will be presently seen, my new process places me in the position of doing so with little labor and almost without expense.

It is well known that large quantities of ammoniacal products are obtained in the process of manufacturing illuminating-gas from bituminous coal, and that consequently coal-gas engineers have taken advantage of the affinity of ammonia for carbonic acid, and are now commonly using it as an effective and inexpensive means of removing the latter impurity from the gas. In the manufacture of water-gas, however, as heretofore conducted, the quantity of ammonia produced is relatively small as compared with that obtained in making coal-gas, while the percentage of carbonic acid is many times greater. Consequently the manufacturers of water-gas have hitherto been unable to avail themselves of ammonia as a purifying agent, while, on the contrary, through the large amount of ammonia obtained by my improved process, I become possessed of a purifying agent which involves but little labor and expense, and which, moreover, leaves me at the end a valuable residual for which there is a constant and increasing demand. For the purpose of purifying my gas from the enormous quantity of carbonic acid which it contains, I therefore avail myself of the great quantity of ammonia resulting from the decomposition of the nitrogen, as described in that part of this specification which relates to the second part of my invention, and by means of scrubbers or other suitable devices and under suitable conditions of moisture and temperature, I bring it (the ammonia) into intimate contact with the carbonic acid and sulphureted hydrogen of the gas and cause it to combine therewith, so as to form soluble salts, which are readily separated and collected. It will be remembered, however, in this connection that in that part of this specification which relates to the second part of my invention I spoke of the practically complete removal of the ammonia from the gas at that time, its combination with the carbonic acid and sulphureted hydrogen of the gas, so as to form soluble salts, and the separation of the same.

I have found it advantageous to remove the ammoniacal products from the gas previous to the purification of the latter from carbonic oxide, so as to preserve them from being decomposed by the intense heat to which the gas is subjected during the latter process. In order that I may avail myself of this ammonia for the removal of the carbonic acid produced from the decomposition of the steam and carbonic oxide, I recover or regenerate it by any suitable process and use it as before, and this I do as often as I require to use it for the purification of the gas from all impurities capable of being removed by ammonia.

I do not claim broadly as new or as my invention the process of purifying gas from carbonic acid and sulphureted hydrogen by means of ammonia, for this is old and well known; but I do claim it as new when used in combination with the second and third parts of my invention, as heretofore described, or with either of them.

I do not claim nor do I bind myself to any particular process of regenerating the ammonia, for there are in use for this purpose several processes which are found to be practical and successful, and which are so well known that it is unnecessary for me to describe any of them.

After the ammonia has served its purpose as a purifying agent I collect it and dispose of it as a residual product to the manufacturing chemists, or I proceed by means of suitable processes to make it enter into such combinations as will produce me merchantable salts of ammonia.

My gas now consists chiefly of pure hydrogen, and, being practically free from all poisonous or otherwise noxious impurities, is eminently fitted to be used as a heating-gas, either for domestic or manufacturing purposes, while it is equally capable of being carbureted by any of the usual and well-known processes, and of being thus converted into an illuminating-gas of a high standard, and practically free from impurities. At the same time there may yet cling to it a small percentage of sulphurous impurities which are incapable of being removed by ammonia, and which may require other means of purification before the gas becomes thoroughly fitted for domestic use, under which circumstances, and for the removal of which impurities, the ordinary iron or lime purification will be quite sufficient, and will be found inexpensive, on account of the extremely small amount of these impurities which can be present.

By the above-described process I am enabled to produce a nearly pure hydrogen gas at a very slight cost, and in addition will have in the enormous quantity of ammonia produced, nearly all of which I recover and dispose of, a valuable residual, the sale of which will, under favorable circumstances, more than repay the cost not only of producing but also of carbureting the gas.

The annexed drawings illustrate and are a part of my invention.

Figure 1 is an elevation of the cupola. Fig. 2 is a vertical section of the ammonia-retort. Figs. 3 and 5 are elevations of the scrubbers. Fig. 4 is a partly sectional view of the retort for decomposing the carbonic oxide.

There are five different and distinct parts shown, and these are numbered from Fig. 1 to Fig. 5, irrespectively of the connecting-pipes.

Fig. 1 shows a cupola or furnace, A, of any suitable construction, in which B is the ash-pit door; C, the chimney, provided with a suitable cap or valve, D; E, a hopper for feeding the furnace; F, a steam and G an air pipe, and H a steam jet or injector connected with a suitable boiler. (Not shown in the drawings.)

Fig. 2 is shown as connected to Fig. 1 by a pipe, I, and represents a retort, K, set in a suitable furnace. This retort is shown as being partly filled, and as being heated by two fires, L and M. Its inlet N is shown as connected to the cupola A, Fig. 1, by the pipe I, while its outlet O is connected with the pipe P.

Fig. 3 shows a scrubber, X, of any suitable construction, provided with an inlet-pipe, Q, an outlet, R, a water-pipe, S, and an overflow, T.

Fig. 4 shows a furnace, U, of any suitable construction, containing a retort, V, with its inlet W, connected to the scrubber X by the pipe R, having a suitable outlet, Y, and being provided with a suitably-connected steam-pipe, a, suitably connected to a boiler. (Not shown in the drawings.)

Fig. 5 shows a scrubber, b, which is attached to the outlet of the retort V, Fig. 4, by the pipe Y, and is provided with its inlet c, outlet d, water-pipe e, and overflow f.

The mode of operation is as follows: I first open the door B and chimney-valve D of the furnace or cupola A, Fig. 1, and having filled the furnace to a suitable depth with coal, coke, charcoal, or any other suitable form of carbon, I ignite the fuel and allow it to burn until it becomes incandescent, at least to a considerable degree. When the fuel in the furnace has attained a proper working heat I close the valve D, and having opened the cock of the steam-pipe F, which is supplied with steam from a suitable boiler, (not shown in the drawings,) and also the cock on the air-pipe G, the steam is blown through the jet H, carrying with it or inducing a current of air drawn through the open air-pipe G, and forcing it into the ash-pit beneath the furnace. As soon as the mingled stream of air and steam strikes the incandescent fuel in the cupola the steam becomes decomposed with a slight explosion, and flame issues from the furnace-door B. The cock g on the pipe I is now opened, and the door B is slightly closed, whereupon the mingled stream of steam and air is forced upward through the mass of incandescent fuel in the cupola, from which they escape through the outlet R as an impure generator-gas, the hydrogen and nitrogen of the steam and air passing on unchanged, while their oxygen combines with the carbon of the coal or other fuel to form carbonic oxide and carbonic acid, in proportions which vary according to the relative volumes of the steam and air, the temperature of the furnace, and the depth of incandescent fuel in it. The production of gas will now be uniform and continuous if proper care be taken to replenish and clean the fire at proper intervals. Its quality, too, will be pretty constant and uniform, if the relative volumes of air and steam are properly adjusted.

Under favorable conditions the average composition of the escaping gas will be about as follows: carbonic acid, ten per cent.; carbonic oxide, seventeen per cent.; hydrogen, thirteen per cent.; nitrogen, sixty per cent.

Although the above form of cupola and order of procedure may be followed with advantage, I do not bind or limit myself to them, as it is evident that they may be varied indefinitely, and that with proper arrangements nearly as good a result can be reached by a simple air-blast alternated with a current of steam and air, as already described.

The generator-gas escaping from the cupola now enters the retort K, Fig. 2, by the inlet N. This retort is shown in the drawings as being heated by a separate fire at each end, so as to afford means of keeping each end at the temperature best suited to the work it has to do. It is evident, however, that the same ends can be reached by means of two or even a series of retorts set in one or more suitably-arranged furnaces. The retort is filled at one end, as shown in the drawings, with coal, coke, charcoal, or some other suitable form of carbon, suitably mixed with an alkali, or some suitable form, compound, or combination of an alkali, and at the other end, or at any other suitable or convenient point, is furnished with the pipe h, supplied with steam from any suitable source. Care is taken that the end of the retort which contains the mixed carbon and alkali is kept at a high temperature and the other end comparatively cool, so that the highly-heated gases escaping from the incandescent mass of carbon and alkali may be reduced to a suitable temperature by the comparatively low heat of the retort itself, as well as by the cooling effect of a volume of steam which is admitted to it through the pipe h. As the gas passes through the incandescent mass of carbon and alkali its nitrogen unites with them to form cyanide and cyanate of the alkali, and these escaping from the incandescent mass and being brought into suitable contact with steam at a suitable temperature, mutual decomposition and transposition of elements ensues, the nitrogen combining with the hydrogen of the steam to form ammonia, and the carbon going to the oxygen to form carbonic oxide and carbonic acid, while the alkali returns to its original condition or unites with the carbonic acid to form a carbonate.

I do not confine or restrict myself to the particular state, form, or combination in which the carbon and alkali are introduced into the retort, for it is well known that under suitable conditions the carbon of the carbonic oxide contained in the gas may be made available for this purpose, and, indeed, it is more than probable that this carbon, under any circumstances, takes its part in the chemical reactions and mutual decompositions which take place within the retort; nor do I confine or restrict myself to the particular form or arrangement of the retort and furnace shown, as it is evident that this may be varied indefinitely, their forms and relative arrangement and connection, the manner of using them, and the order and nature of the chemical changes and reactions which take place within them varying according to the nature and form of the alkali used, as well as of those of the products desired.

From the retort K the gas, freed as far as desirable from nitrogen, now passes through the outlet O and connecting-pipe P to the scrubber X, Fig. 3, through which it passes slowly, and in which it is continually broken up and brought into contact with the cool wet surfaces of coke, brush, slats, or other substances capable of obstructing and breaking it up, with which the scrubber is filled, and over which water or other liquid is caused to trickle slowly. The consequence of this scrubbing process is that the gas attains a low temperature, and the ammonia, taking up its equivalent of carbonic acid, is converted into a carbonate, which is immediately dissolved by the liquid passing through the scrubber, and is carried off by it through the overflow T. The gas, which is now reasonably free from nitrogen, escaping from the scrubber through the pipe R, enters the retort V, Fig. 4, at W, where it meets with a current of steam supplied from a suitable boiler through the pipe a, and preferably superheated, and immediately decomposes it, the oxygen of the steam combining with the carbonic oxide of the gas and converting it into carbonic acid, while its hydrogen is set free and goes to swell the volume of the combustible gases. The volumes of carbonic acid and hydrogen resulting from the decomposition of the steam by the carbonic oxide will be in all cases each equal to the entire volume of carbonic oxide removed from the gas.

The gas yet requires to be freed from the enormous volume of carbonic acid which it contains, and this I effect by causing it to pass from the retort V, Fig. 4, through the connecting-pipe Y into the scrubber b, Fig. 5, which it enters at c, and in which it meets with a volume of ammonia which has meanwhile been regenerated or recovered from the acids with which it had been combined, and which had been caused to enter the scrubber through a suitable connection. (Not shown in the drawings.) The gas now passes slowly upward through the scrubber in company with the ammonia, and both gases being thoroughly mixed and broken up by the obstructions which they meet with, and being, moreover, subjected to suitable cooling influences and to the contact of wet surfaces, the ammonia again takes up its equivalent of carbonic acid, the resulting carbonate being dissolved in the liquid and passing off through the overflow of the scrubber, as before. As the volume of carbonic acid in the gas as it leaves the retort V is usually much more than the equivalent of the regenerated ammonia, it is mostly necessary to regenerate the latter more than once before it can be made available for the complete removal of the carbonic acid.

The gas is now in a proper condition for use as a heating or illuminating agent. For the former use it is only necessary to distribute it to and to consume it in suitable burners or other apparatus; but for the latter it still requires to be suitably carbureted or enriched with hydrocarbon gases or vapors before it becomes capable of being used for the ordinary purposes of illumination. As, however, there are various well-known processes for this purpose, and as, moreover, they have no connection with my invention except incidentally, it is unnecessary for me to do more than allude to them.

The ammonia having now done its work as a purifying agent, I next proceed to collect and transform it into a commercial shape, and for this purpose I employ any of the well-known processes now so generally used.

The enormous quantities of carbonic acid produced have also a commercial value, and I endeavor, as far as possible, to preserve and utilize this gas by combining it with suitable bases, so as to form therewith salable carbonates.

I do not bind or confine myself to the processes or succession of processes or to the forms of apparatus described, for it is very evident that in a continuous and extended process like my invention the several processes and details, and the exact order and succession of the same, as well as the forms, construction, and arrangement of the apparatus used, may be varied indefinitely.

I do not claim any one of the several parts or processes which go to make up my improved process and apparatus separately and of itself, broadly, as new and as my invention, for they are all old and well known, and have been in use heretofore in independent processes in the arts; but I do claim their combination as a whole, so as to constitute a new process, as well as the several combinations into which they enter with each other, and the parts which they play as members of the general process and arrangement of apparatus, as follows:

What I claim, and desire to secure by Letters Patent, is—

1. The process herein described of generating and purifying gas, said process consisting of the several parts and processes described, substantially as follows: first, in injecting or forcing air and steam into or through incandescent carbon contained in a suitable furnace, causing the air and steam to combine with the carbon and to produce carbonic oxide and carbonic acid, the hydrogen of the decomposed steam and the nitrogen of the air being at the same time set free; second, in the separation of the nitrogen from the gas by converting it into ammonia, said conversion being effected by causing it to combine with carbon and alkali, so as to form cyanogen, and subsequently decomposing the cyanogen so formed by means of steam, the product being ammonia, the oxides of carbon, and alkali, and subsequently removing the ammonia, substantially as described; third, in decomposing the carbonic oxide in the gas and converting it into carbonic acid by means of incandescent steam, the product of said decomposition being carbonic acid and hydrogen gas; fourth, in the removal of the carbonic acid from the gas by means of ammonia, substantially as described.

2. In the manufacture of gas through the decomposition of steam and air by incandescent carbon, the process of separating the resulting nitrogen from the crude gas, which consists in introducing the latter into a suitable retort or series of retorts containing carbon and alkali, or any suitable form, compound, or combination thereof in an incandescent state, and causing it to combine therewith and to form cyanogen, and subsequently decomposing such cyanogen by means of steam and forming ammonia, substantially as described.

3. In the manufacture of water-gas, the process of separating nitrogen and carbonic oxide from the gas, consisting in, first, the introduction of the gas into a suitable retort or series of retorts containing carbon and alkali in an incandescent state, and causing it to combine therewith to form cyanogen, and subsequently decomposing the cyanogen so formed by means of steam, the products of said decomposition being ammonia, oxides of carbon, and alkali; second, the removal of the ammonia from the gas by means of suitable scrubbers; third, the removal of the carbonic oxide from the gas by causing it to be decomposed by incandescent steam, the result of such decomposition being carbonic acid and free hydrogen, substantially as described.

4. In a process for manufacturing gas by decomposing steam and air by incandescent carbon, and for purifying such gas from nitrogen and carbonic oxide by converting the former into ammonia and the latter into carbonic acid, the process of converting the nitrogen into ammonia and of separating the latter from the gas previous to the decomposition of the carbonic oxide by incandescent steam, substantially as described.

5. A furnace, U, containing a retort, V, and placed between the scrubbers X and $b$, in combination with said scrubbers, in the manner and for the purpose substantially as set forth and described.

6. The combination of a furnace or cupola, A, retorts K and V, and scrubbers X and $b$, constructed and operated substantially as described.

In testimony whereof I have signed my name to this specification before two subscribing witnesses.

THOS. B. FOGARTY.

Witnesses:
  WM. H. BLAKEMAN, Jr.,
  CHARLES TERRY AUSTIN.